F. A. BAUM.
CASTER.
APPLICATION FILED JULY 23, 1915.
1,181,631.
Patented May 2, 1916.
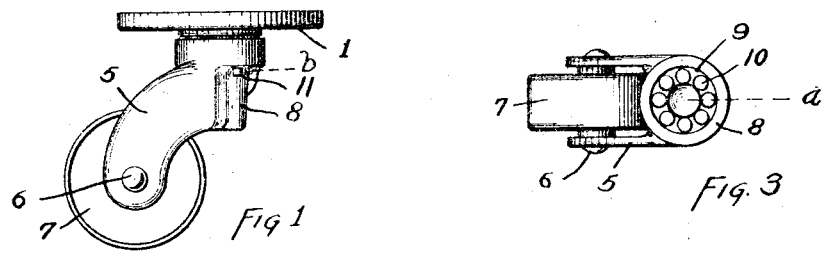
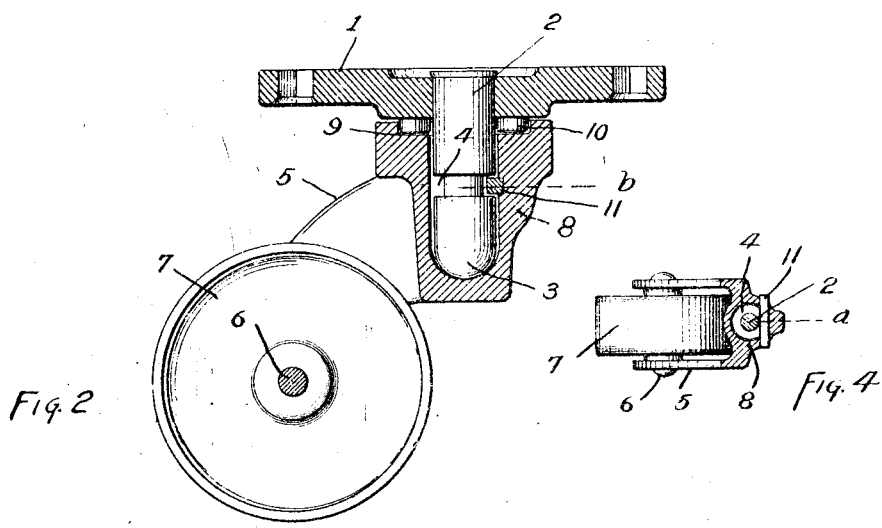
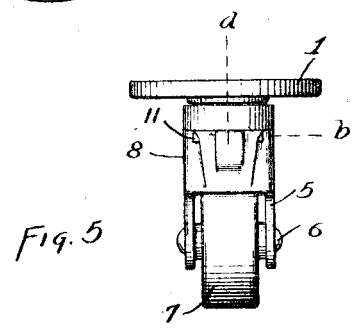
Witness:
Geo. Johnson
Frank A. Baum
Inventor
by James W. See
Attorney

UNITED STATES PATENT OFFICE.

FRANK A. BAUM, OF HAMILTON, OHIO.

CASTER.

1,181,631.  Specification of Letters Patent.  Patented May 2, 1916.

Application filed July 23, 1915. Serial No. 41,595.

*To all whom it may concern:*

Be it known that I, FRANK A. BAUM, a citizen of the United States, residing at Hamilton, Butler county, Ohio, have invented certain new and useful Improvements in Casters, of which the following is a specification.

The present invention relates to casters of the one-wheel type designed for use on trucks about manufacturing establishments, the casters being of large size with wheel four or more inches in diameter. These trucks are used on shop floors of uneven character and littered with various obstructions and the trucks often carry heavy loads and are carelessly used, the result being that the casters are subjected to rather heavy punishment. Freedom of swiveling of the housing upon the stem is of high importance in casters employed for this purpose, and this freedom of swiveling is seriously interfered with by the accumulation of foreign matter incident to the situations in which the casters are employed.

My improvements aim at improving the operation of casters under the stated circumstances.

My improvements will be readily understood from the following description taken in connection with the accompanying drawing in which:

Figure 1 is a side elevation of a caster exemplifying my invention; Fig. 2 a vertical section of the same in the plane of line *a* of Fig. 3, 4 and 5, the wheel of the caster appearing in this view in side elevation; Fig. 3 a plan of the caster with the plate and stem absent; Fig. 4 a horizontal section of the housing and stem in the plane of line *b* of Figs. 2 and 5; and Fig. 5 a front elevation of the caster.

A diversity of scales is employed in the drawing.

In the drawing—1, indicates the plate to serve in securing the caster to the truck: 2, a stem projecting downwardly and rigidly therefrom: 3, the hemispherical lower end of the stem: 4, a circumferential groove formed in the stem between the plate and the lower end of the stem; 5, the housing: 6, the wheel-axle carried by the housing: 7, the floor-wheel journaled on the axle: 8, a deep cup forming part of the housing and engaging, with a hemispherical bearing, the lower end of the stem, this cup extending upward around the stem and close to plate 1: 9, a circular counterbore in the upper end of the cup, with its inwall concentric with the stem: 10, a series of anti-friction rollers in disk form disposed in the counterbore and adapted to engage the inwall of the counterbore and the exterior of the stem just below the plate: and 11, a pin, preferably square in cross-section, disposed in a horizontal aperture through the cup and having its intermediate portion engaging groove 4 of the stem.

In assembling the parts, the axle 6 is passed through the horns of the housing and through the floor wheel and riveted in the usual manner. The vertical cavity within the cup 8 is then filled with lubricating grease and the anti-friction rollers placed in position. The stem is then inserted downwardly into the cup, within the circle of the anti-friction rollers, the result being that some of the grease is forced upwardly and into the counterbore, and some of it entirely out of the structure. The pin 11 is then inserted, thus securing all of the parts together. It is preferred that the pin be slightly upset, as by lightly prick punching each of its ends so that the pin, while ordinarily remaining in proper place, may be driven out when it becomes desirable to disconnect the parts. The grease inserted within the cup serves not only to lubricate the hemispherical bearing at the foot of the stem but also to seal the joint between the plate and the rim of the cup, thus preventing the access of dust and other foreign matters to the anti-friction wheels and to the bearing at the foot of the stem. When a lack of freedom of the swiveling motion occurs it is evidence that the sealing effected by the grease has become impaired, and in such case pin 11 may be driven out and the parts separated and cleaned and the cup refilled with grease. The rim of the cup should come as close to the plate as is practicable, it being understood that the rim of the cup should not touch the plate and create friction to interfere with the freedom of swiveling motion.

I claim:—

A caster comprising a plate adapted to serve in securing the caster to a truck or the like, a stem rigidly secured to said plate and provided with a hemispherical lower end, a cup shaped housing arranged to be rotatably secured to said stem, said housing being provided with a counterbore around the rim of the cup and a hemispherical bearing for the lower end of said stem at the bottom of said cup whereby said plate is supported slightly above said housing, a circular series of anti-friction rollers disposed in said counterbore and contiguous to said plate whereby said rollers are maintained in said counterbore by said plate, said rollers being arranged to serve as lateral bearings for said stem, removable means carried by said housing for preventing the displacement of said housing from said stem, horns on said housing and a floor-wheel rotatably mounted between said horns.

FRANK A. BAUM.

Witnesses:
M. S. BELDER,
CHARLES VOLLBRECHT,